United States Patent [19]

Raynes

[11] Patent Number: 5,417,574
[45] Date of Patent: * May 23, 1995

[54] HANDRAIL SYSTEM PROVIDING AUDIO MESSAGES FOR THE VISUALLY IMPAIRED

[76] Inventor: Coco Raynes, 11-13 Remington St., Cambridge, Mass. 02138

[*] Notice: The portion of the term of this patent subsequent to Feb. 8, 2011 has been disclaimed.

[21] Appl. No.: 116,871

[22] Filed: Sep. 3, 1993

Related U.S. Application Data

[63] Continuation of Ser. No. 942,302, Sep. 9, 1992, Pat. No. 5,284,444.

[51] Int. Cl.6 .............................................. G09B 21/00
[52] U.S. Cl. ..................................... 434/112; 434/113
[58] Field of Search ...................... 434/112, 113, 116; 182/18; 40/455, 457; 256/59

[56] References Cited

U.S. PATENT DOCUMENTS

| | | | |
|---|---|---|---|
| 4,347,499 | 8/1982 | Burkman, Sr. et al. | 340/371 |
| 4,504,933 | 3/1985 | Janney | 367/197 |
| 4,823,524 | 4/1989 | Bednar | 52/182 |
| 5,065,837 | 11/1991 | Szudy | 182/10 |
| 5,284,444 | 2/1994 | Raynes | 434/113 |

FOREIGN PATENT DOCUMENTS

| | | | |
|---|---|---|---|
| 209291 | 8/1989 | Japan | 434/113 |
| 1454458 | 1/1989 | U.S.S.R. | 434/116 X |

*Primary Examiner*—Gene Mancene
*Assistant Examiner*—Jeffrey A. Smith
*Attorney, Agent, or Firm*—Lahive & Cockfield

[57] ABSTRACT

A system of handrails extends throughout a building with braille messages imprinted on the inside of the handrail to give identification, direction and warning to the user. The handrail also includes audio message means operable by a message initiation means that is operable by a visually impaired person.

2 Claims, 4 Drawing Sheets

HANDRAIL SYSTEM PROVIDING AUDIO MESSAGES FOR THE VISUALLY IMPAIRED

This is a continuation of application Ser. No. 07/942,302, filed on Sep. 9, 1992, now U.S. Pat. No. 5,284,444.

BACKGROUND OF THE INVENTION

The invention relates generally to systems for aiding the visually impaired and particularly to a handrail system for guiding the visually impaired through a building.

Concern about accessibility to buildings and other structures by the physically impaired has increased in recent years. Legislation and a new general sensitivity has lead to modifications and additions to relieve the burdens placed on the physically impaired.

For example, most elevators now include braille indicators on the control panel so that the visually impaired can determine the location and function of buttons on the panel. It is still true, however, that the visually impaired obtain very little real assistance in the way of signage in buildings. The new American Disability Act requires that door signs for public buildings include braille indicators. However, there are no links between door signs and no readily available indicators to the visually impaired where the door signs are.

Much more can be done, therefore, to assist the visually impaired and it is the purpose of this invention to provide such assistance.

SUMMARY OF THE INVENTION

The present invention provides a system for guiding visually impaired persons through a building. The system includes a series of consecutive handrails mounted within building structures throughout the building. Braille messages are imprinted on the side of the handrails with each message to give identification, direction and warning, such as (a) the location of the handrail, (b) the location of nearby departments, facilities, offices and rooms, (c) the location of interruptions of the handrail, (d) slopes, steps, wall openings, obstructions and turns, and (e) other information about the building.

The message is preferably imprinted on the inside side of the handrail so it may be read easily by the tips of the fingers of the users.

In addition, at least some of the handrails have audio message means for an audio description of locations and a message initiation means for operating the message means, the message initiation means being operable by a visually impaired person.

BRIEF DESCRIPTION OF THE DRAWINGS

Other objects, features and advantages of the invention will be described herein or will be obvious from the following description of a preferred embodiment of the invention, including the drawings in which.

DESCRIPTION OF THE PREFERRED EMBODIMENT

Figure 1:
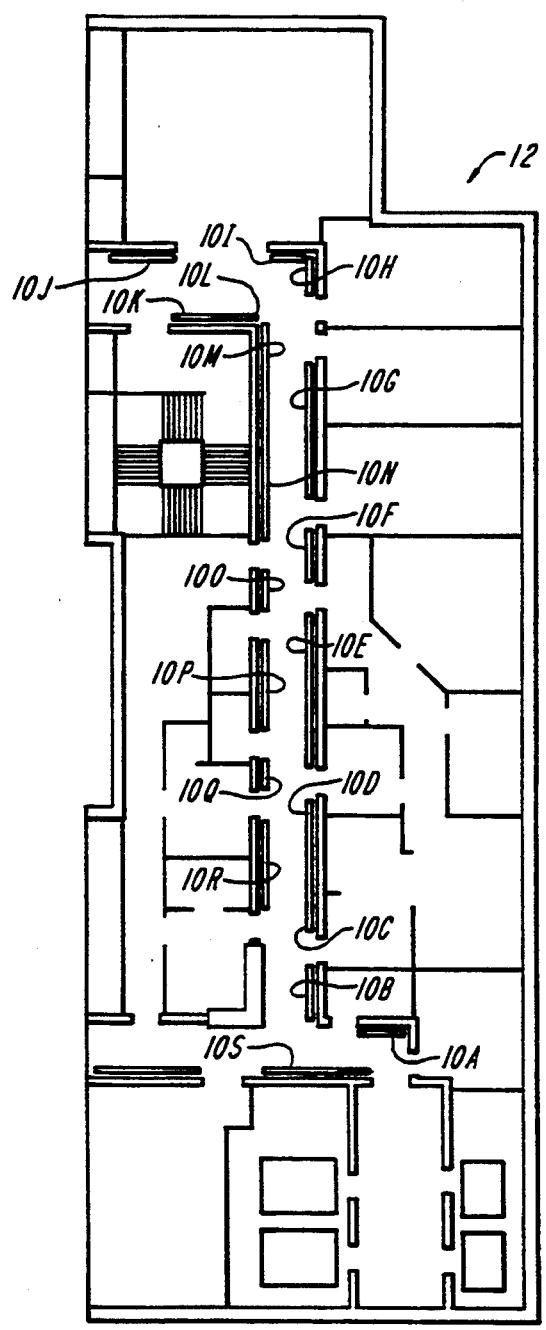
FIG. 1 is a plan of a floor of a building indicating the location of handrails of the system of the invention thereon.

As shown in FIG. 1, the system of the invention comprises a series of handrails 10A–10S extending through a building 12. Each handrail 10 (see FIG. 2) has along its inner side 14 (between the handrail and the wall) a tape 16 with a series of brief braille directions or instructions 18. The braille indicator 18 identifies, and guides the user to, departments, offices and public facilities and provides other information necessary for the visually impaired user to find his or her way through a public building. It also warns the user of slopes, steps, wall openings, obstructions and turns. In effect, the handrail indicates at least one of (a) the location of the handrail, (b) the location of nearby departments, facilities, offices and rooms, (c) the location of interruptions of the handrail, (d) slopes, steps, wall openings, obstructions and turns, or (e) other information about the building. In addition to braille, at major corridor entries (e.g. 10A) the handrail 10 incorporates an audio message announcer 20 to give supplementary information, which is activated by means of a button 22.

Figure 2:
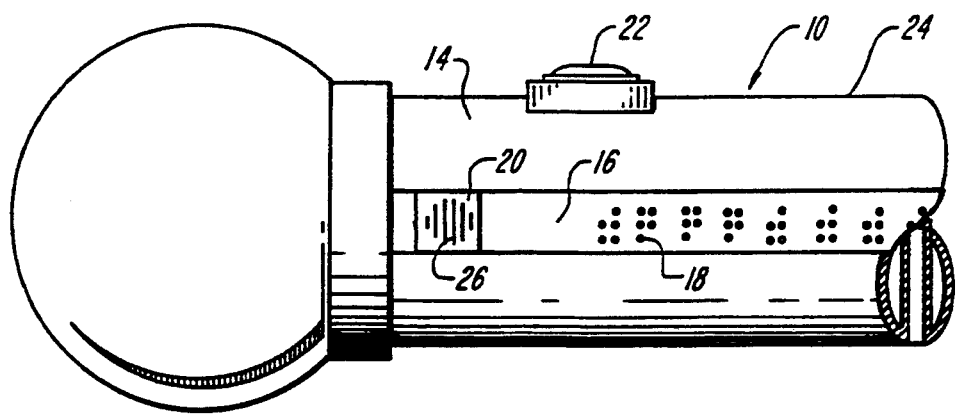
FIG. 2 is an elevation of the back side of one embodiment of a handrail used in the system showing braille messages thereon.
Figure 3:
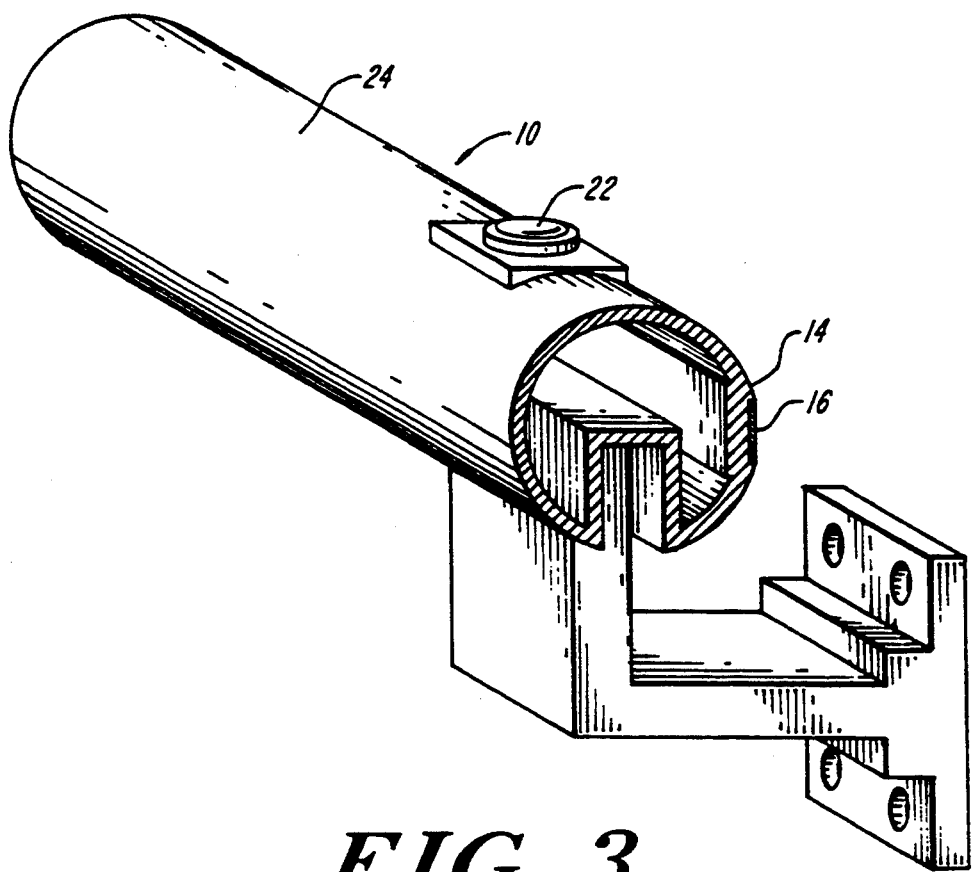
FIG. 3 is a perspective, cut-away view of the handrail of FIG. 2.

As shown in FIG. 2, the location of the indicators 18 are where they can be comfortably read by the tips of the fingers of someone using the handrail 10 as a guide, with the hand resting on top 24 of the handrail 10.

It is important to note that the collection of handrails 10 forms a system. That is, the handrail 10 does not simply give information to the visually impaired user regarding his or her location. It refers to other handrails 10 so that the system is a guide for maneuvering throughout the building 12. By contrast, the merely occasional use of braille indicators presently available do not encourage visually impaired persons to use them, so that they rely on other means for identifying their position and location in a building.

For example, referring to FIG. 1, the handrails 10 in the system might have braille messages on them such as the following:

A. On this floor: Ambulatory Surgery Center, Neuro-Opthalmology, Occupational Therapy Service, and Vision Rehabilitation Handrail interrupted by door B. Reception Desk on left, opposite side of corridor Neuro-Opthalmology next door on right C. Occupational Therapy, Vision Rehabilitation, and Neuro-Opthalmology Exam Rooms ahead D. Rehabilitation Center on left, opposite side of door Handrail interrupted by door E. Handrail interrupted by door F. Neuro-Opthalmology Exam Room 1 next door on right Occupational Therapy Service on left, opposite side of corridor G. Neuro-Opthalmology Exam Room 2 next door on right Exam Room 3 second door on right H. Corridor turns left I. Vision Rehabilitation Department: Reception, Library and Social Work on right J. Emergency Stairs on left, opposite side of corridor K. Vision Rehabilitation Department: Reception, Library, and Social Work on left, opposite side of corridor Occupational Therapy, Rehabilitation Center, Neuro-Opthalmology, Ambulatory Surgery Reception ahead L. Corridor turns right M. Neuro-Opthalmology Exam Rooms 2 and 3 on left, opposite side of corridor N. Neuro-Opthalmology Exam Room 1 on left, opposite side of corridor Occupational Therapy Service next door on right O. Handrail interrupted by door P. Handrail interrupted by door Q. Rehabilitation Center next to door on right Neuro-Opthalmology on left, opposite side of corridor Reception Desk: Ambulatory Surgery Center, Same Day Admissions Elevators ahead across corridor S. Front Elevator Lobby next door on right.

In addition, some or all of the handrails 10 are capable of giving audio messages to the visually impaired. As shown in FIG. 2, some message initiation means such as a button 22 or switch may be located on the handrail 10. The braille indicators 18 may tell that an audio message is available. The button 22 or switch itself may have a braille indicator concerning its function. Other signage on the handrail 10 can inform the user that audio message means 20 are available as certain consistent locations on the handrail system throughout the building 12.

A conventional audio message means 20 with a speaker 26 located in or near the handrail 10 would have a recorded message to give useful information to the user. The information could repeat information that is on the handrail 10, it could offer supplemental information, or it could inform the user about the handrail system and how it works.

Figure 4:
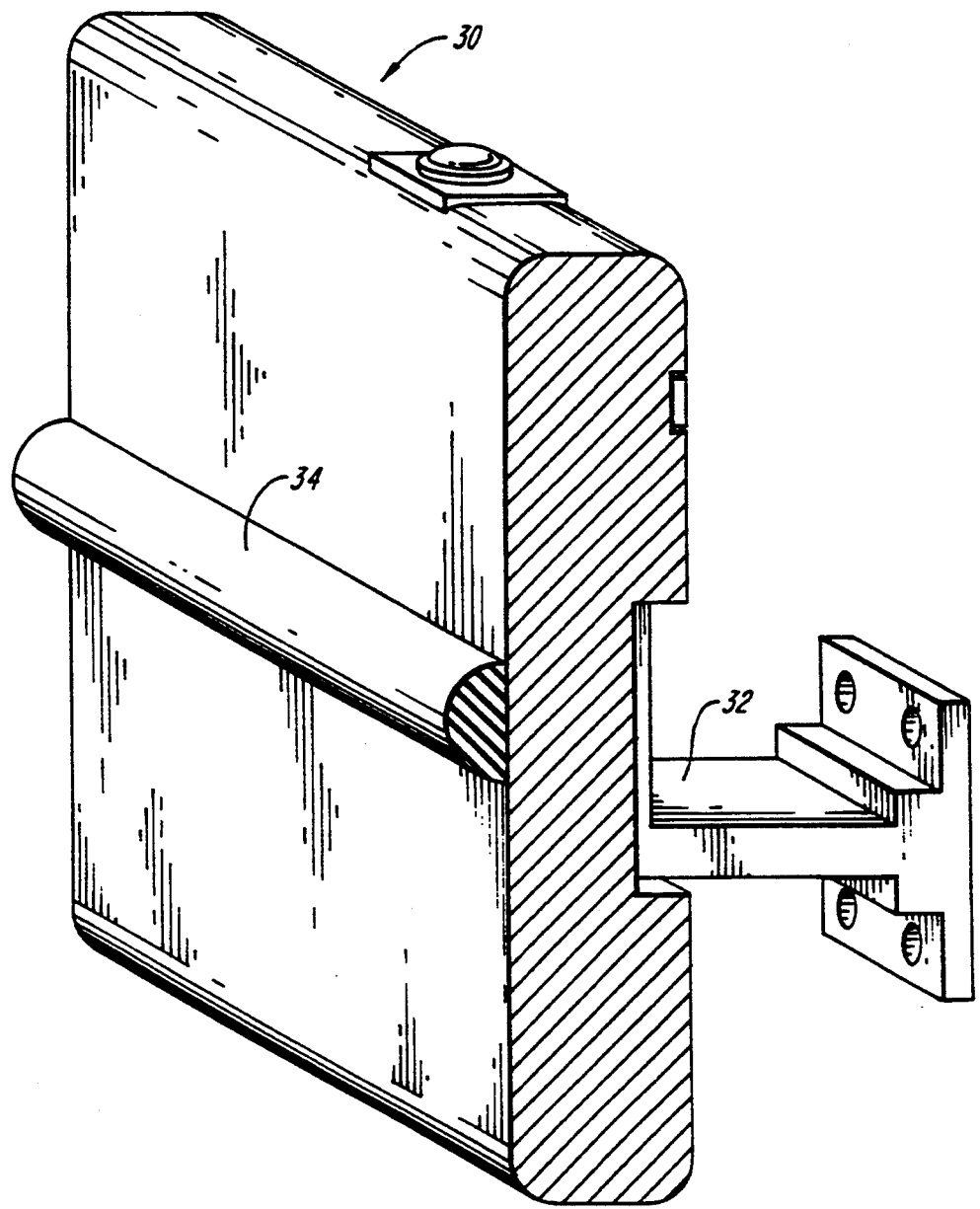
FIG. 4 is a perspective cut-away view of a second embodiment of a handrail used in the system.
Figure 5:
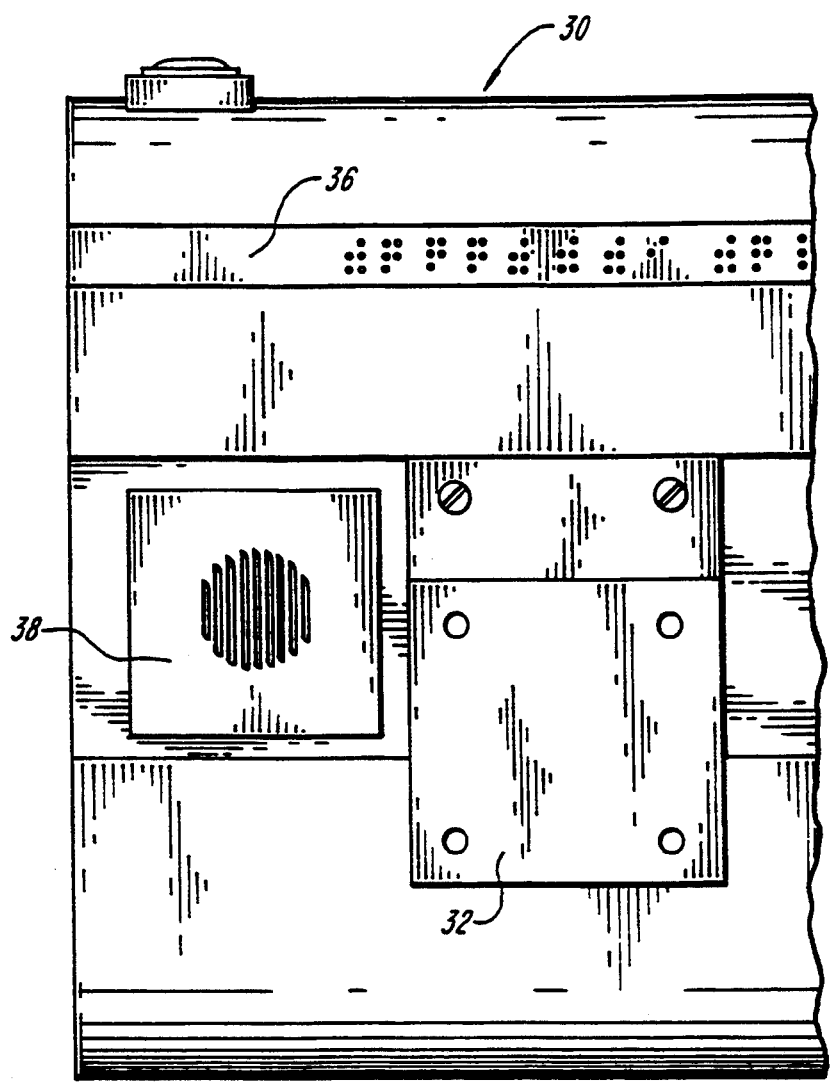
FIG. 5 is an elevation of the back of the handrail of FIG. 4.

FIGS. 4 and 5 show a second embodiment of handrails 30, made of wood, also mounted on brackets 32 to be attached to walls. The handrails 30 of the second embodiment include a rubber protective strip 34 to protect the handrail 30, and similar braille tape 36 and touch activated audio message means 38.

In use then, a visually impaired person entering a building 12 and grasping a handrail 10 would immediately be given information about the presence of a handrail guidance system throughout the building. The information could generally describe what was in the building and some directions for getting around it, in the same way that ordinary signs perform that function for those people who can see. In effect, the visually impaired would have a system of "signs" as significant and useful, and perhaps more so, as those available to the people who are not visually impaired. The system is a improvement over a simple handrail along the stairs that indicates on what step the user of the handrail is (such as the one shown in U.S. Pat. No. 5,065,837). The system of the invention provides a series of handrails integrated into a coherent overall system and has a very broad amount of information to be given by the braille indicators.

Other variations of the embodiment described herein may occur to those skilled in art, and are intended to come within the scope of the invention as described in the following claims.

What is claimed is:

1. A system for guiding visually impaired persons, comprising a handrail,
   said handrail including audio message means for audio description of locations, and
   message initiation means operatively connected to said audio message means for initiating said message,
   said message initiation means being operable by a visually impaired person.

2. A system for guiding visually impaired persons in a building, comprising
   a series of consecutive handrails mounted in the building, and extending throughout the building,
   in which at least one handrail includes an audio message means for audio description of locations in the building, and message initiation means operatively connected to said audio message means for initiating said message, said message initiation means being operable by a visually impaired person.

* * * * *